US010955906B2

(12) United States Patent
Lobo et al.

(10) Patent No.: US 10,955,906 B2
(45) Date of Patent: Mar. 23, 2021

(54) MULTI-LAYERED PROCESSOR THROTTLE CONTROLLER

(71) Applicant: International Business Machines Corporation, Armonk, NY (US)

(72) Inventors: Preetham M. Lobo, Bangalore (IN); Tobias Webel, Schwaebisch-Gmuend (DE); Pradeep Bhadravati Parashurama, Bhadravati (IN); Alper Buyuktosunoglu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 16/269,661

(22) Filed: Feb. 7, 2019

(65) Prior Publication Data
US 2020/0257349 A1    Aug. 13, 2020

(51) Int. Cl.
G06F 1/26    (2006.01)
G06F 1/329    (2019.01)
G06F 1/3203    (2019.01)

(52) U.S. Cl.
CPC ............ G06F 1/329 (2013.01); G06F 1/3203 (2013.01)

(58) Field of Classification Search
CPC ....................................................... G06F 1/329
USPC ........................................................ 713/323
See application file for complete search history.

(56) References Cited

U.S. PATENT DOCUMENTS

| 5,805,907 | A | 9/1998 | Loper et al. |
| 6,029,006 | A | 2/2000 | Alexander et al. |
| 6,138,232 | A | 10/2000 | Shiell et al. |
| 6,564,328 | B1* | 5/2003 | Grochowski ......... G06F 1/3203 712/E9.049 |
| 6,901,521 | B2 | 5/2005 | Chauvel et al. |
| 7,966,511 | B2 | 6/2011 | Naveh et al. |
| 2002/0055961 | A1* | 5/2002 | Chauvel .............. G06F 12/1027 708/100 |
| 2003/0126478 | A1* | 7/2003 | Burns .................... G06F 9/3017 713/300 |
| 2006/0041766 | A1* | 2/2006 | Adachi ................... G06F 1/206 713/322 |

(Continued)

FOREIGN PATENT DOCUMENTS

WO    2002073336 A2    9/2002
WO    2017218123 A1    12/2017

OTHER PUBLICATIONS

S. Bhowmik, et al., "Power Supply Noise Reduction of Multicore CPU by Staggering Current and Variable Clock Frequency" IEEE Transactions on Components, Packaging and Manufacturing Technology, Feb. 2018, 8 pages.

*Primary Examiner* — Volvick Derose
(74) *Attorney, Agent, or Firm* — Cantor Colburn LLP; William Kinnaman

(57) ABSTRACT

An aspect includes a plurality of throttle controllers having a modular hierarchy comprising a plurality of levels within each of a plurality of processor cores that control a plurality of throttling actions. The throttling actions include dynamic adjustment of execution suspension within the processor cores. A plurality of input throttle events at each of the processor cores is resolved based on the modular hierarchy. A chip controller coupled to the processor cores can synchronize the throttling actions between the processor cores.

17 Claims, 11 Drawing Sheets

(56) References Cited

U.S. PATENT DOCUMENTS

| | | | |
|---|---|---|---|
| 2008/0028244 A1* | 1/2008 | Capps | G06F 1/206 |
| | | | 713/324 |
| 2008/0163226 A1* | 7/2008 | Radhakrisnan | G06F 1/206 |
| | | | 718/102 |
| 2011/0022857 A1* | 1/2011 | Nussbaum | G06F 1/3287 |
| | | | 713/300 |
| 2012/0254641 A1* | 10/2012 | Rotem | G06F 11/3058 |
| | | | 713/320 |
| 2014/0181537 A1* | 6/2014 | Manne | G06F 1/324 |
| | | | 713/300 |
| 2014/0325247 A1 | 10/2014 | Sodhi et al. | |
| 2016/0072883 A1* | 3/2016 | Long | G06F 11/16 |
| | | | 709/219 |
| 2016/0086077 A1* | 3/2016 | Akopyan | G06N 3/049 |
| | | | 706/23 |
| 2016/0098070 A1* | 4/2016 | Curran | G06F 1/3206 |
| | | | 713/300 |
| 2016/0316438 A1 | 10/2016 | Stewart | |
| 2017/0123467 A1* | 5/2017 | Ignowski | G06F 1/206 |
| 2018/0167878 A1 | 6/2018 | Lee et al. | |

\* cited by examiner ately pointed out and distinctly claimed in the claims
MULTI-LAYERED PROCESSOR THROTTLE CONTROLLER

BACKGROUND

The present invention relates to computer systems, and more particularly, to a multi-layered processor throttle controller.

Computer systems can include a variety of processing resources that can be shared between multiple applications and/or multiple logical partitions. Power demands within components, such as multi-core processors, can change over time as various workloads are started and completed. Changes in workloads, power supply fluctuations, thermal events, and other such factors can impact power management within a processing system. Frequency and voltage scaling can be used to adjust power consumption within a processing system but may result in power system noise and other effects.

SUMMARY

According to a non-limiting embodiment, a method includes controlling, by a plurality of throttle controllers having a modular hierarchy comprising a plurality of levels within each of a plurality of processor cores, a plurality of throttling actions. The throttling actions include dynamic adjustment of execution suspension within the processor cores. A plurality of input throttle events at each of the processor cores is resolved based on the modular hierarchy. A chip controller coupled to the processor cores can synchronize the throttling actions between the processor cores.

According to a non-limiting embodiment, a system includes a plurality of processor cores each including a plurality of throttle controllers having a modular hierarchy with a plurality of levels configured to control a plurality of throttling actions. The throttling actions include dynamic adjustment of execution suspension within the processor cores. A chip controller coupled to the processor cores is configured to synchronize the throttling actions between the processor cores.

According to a non-limiting embodiment, a computer program product includes a computer readable storage medium having program instructions embodied therewith. The program instructions are executable by a processing circuit to perform a plurality of operations including controlling, by a plurality of throttle controllers having a modular hierarchy comprising a plurality of levels within each of a plurality of processor cores, a plurality of throttling actions. The throttling actions include dynamic adjustment of execution suspension within the processor cores. A plurality of input throttle events at each of the processor cores is resolved based on the modular hierarchy. The operations further include synchronizing, by a chip controller coupled to the processor cores, the throttling actions between the processor cores.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
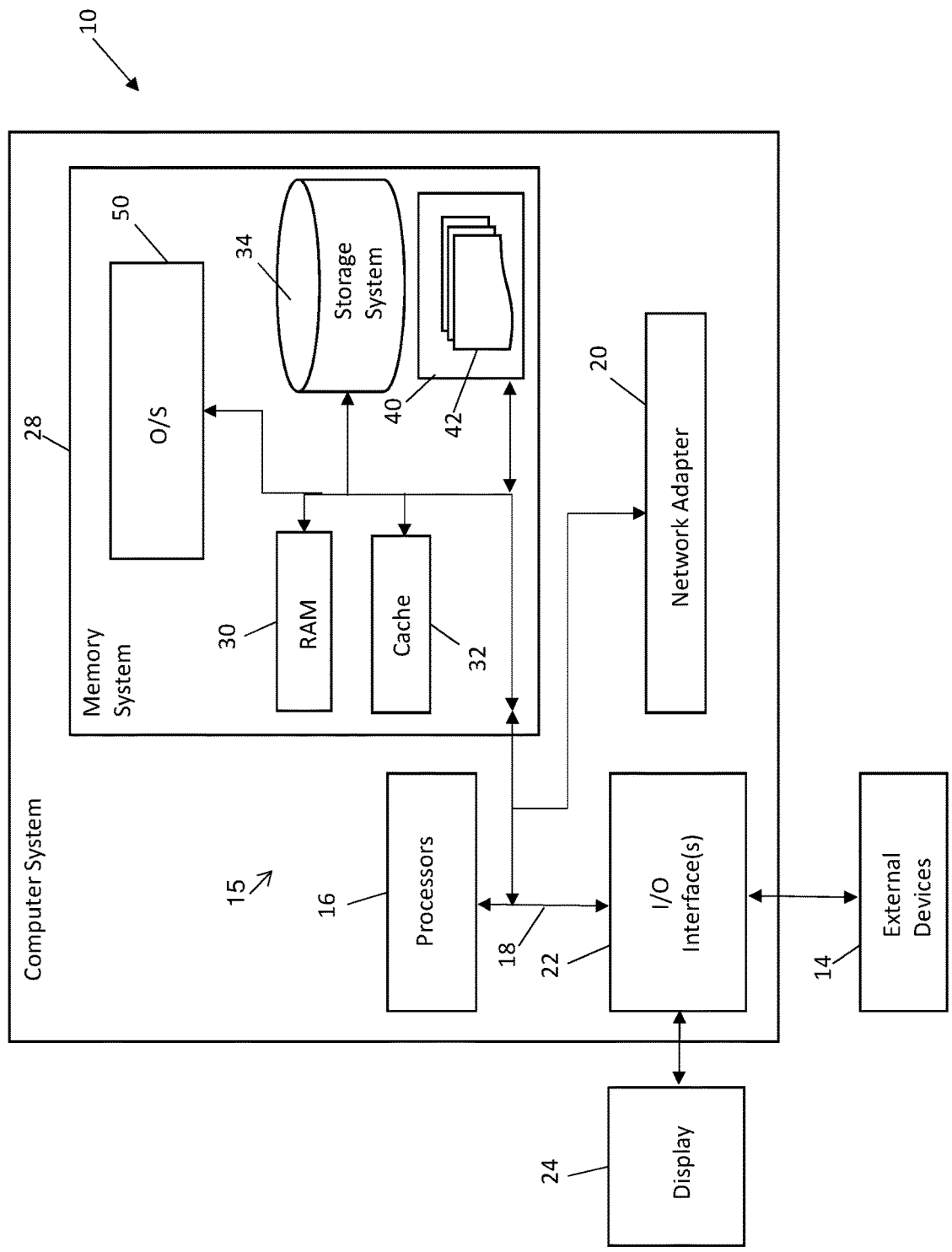
FIG. 1 is a block diagram illustrating a computer system in accordance with various embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in computer systems, various power management mechanisms can be used to selectively reduce power consumption. Dynamic voltage and frequency scaling may adjust voltage levels and/or operating frequencies for processor cores or other system components, for instance, as power demand fluctuates. Performance throttling is an alternate mechanism that can be used to reduce system performance, for instance, to mitigate resilience-threatening conditions by temporarily suspending the execution of one or more processing system resources. When performance throttling is triggered, an execution pipeline of a processor can be suspended for one or more cycles to reduce power consumption and voltage droop. Power consumption may need to be reduced where current draw exceeds a limit, thermal conditions exceed a limit, a voltage droop drops below a limit, and other such factors that may lead to a processing system fault if not timely addressed. In multi-core processors, there can be multiple throttling controls. If throttling is not synchronized, particularly upon transitioning from a throttled state to an unthrottled state, noise can be induced, which may result in performance issues or other adverse effects.

Turning now to an overview of the aspects of the invention, one or more embodiments of the invention address the above-described shortcomings of the prior art by providing a structured, modular, and hierarchical system for handling core performance throttling in a processing system. Different layers within a processor core can handle various loop speeds and requests from various types of throttling event triggers. A throttling control can include hierarchical resolution of throttling events as throttling actions to manage voltage noise, power, and thermal aspects. Chip-level staggering of multiple throttling action terminations can be used to avoid large current changes per unit of time. Power management control loops can run at different intervals for thermal events, power-capping events, and voltage noise (e.g., droop events).

The above-described aspects of the invention address the shortcomings of the prior art by distributing throttle control between higher and lower level controllers. A controller can generate a throttle event when, for instance, a collection of individual core-level power-proxies has exceeded a predetermined threshold, which indicates more than expected power-consumption at a chip-level. The event can be sent to all of the cores in the chip simultaneously to trigger a throttle action. Throttle event de-assertion can be performed in a staggered manner between cores to avoid inducing power-noise during an unthrottled time-frame. Technical effects and benefits can include management of voltage noise, power and thermal aspects in a multi-core processor. A modular implementation of the throttle control can enable simpler and faster design updates and verification as new layers are added based on new demands to trigger throttling.

With reference now to FIG. 1, a computer system 10 is illustrated in accordance with a non-limiting embodiment of the present disclosure. The computer system 10 may be based on the z/Architecture, for example, offered by International Business Machines Corporation (IBM). The architecture, however, is only one example of the computer system 10 and is not intended to suggest any limitation as to the scope of use or functionality of embodiments described herein. Regardless, computer system 10 is capable of being implemented and/or performing any of the functionality set forth hereinabove.

Computer system 10 is operational with numerous other computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, elements of the computer system 10 can be incorporated in one or more network devices to support computer network functionality, such as a network switch, a network router, or other such network support devices.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, a plurality of processing resources (referred to generally as processing units 15) which may include one or more processors 16 with one or more processor cores, a memory system 28, and a bus 18 that operably couples various system components including memory system 28 to processors 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that are accessible by computer system/server 10, and they include both volatile and non-volatile media, removable and non-removable media.

Memory system 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory system 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include communication protocol support as one or more drivers to implement various protocol layers in a protocol stack (e.g., transmission control protocol/internet protocol (TCP/IP)) to support communication with other computer systems across one or more computer networks.

The storage system 34 can store a basic input output system (BIOS). The BIOS is a set of essential routines that initialize and test hardware at startup, start execution of the OS 50, and support the transfer of data among the hardware devices. When the computer system 10 is in operation, at least one of the processors 16 is configured to execute instructions stored within the storage system 34, to communicate data to and from the memory system 28, and to generally control operations of the computer system 10 pursuant to the instructions.

Program/utility 40, having a set (at least one) of program modules 42, may be stored in memory system 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein at an application layer level in a communication protocol stack.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, processing accelerators, external disk drive arrays, RAID systems, tape drives, data archival storage systems, etc.

Figure 2:
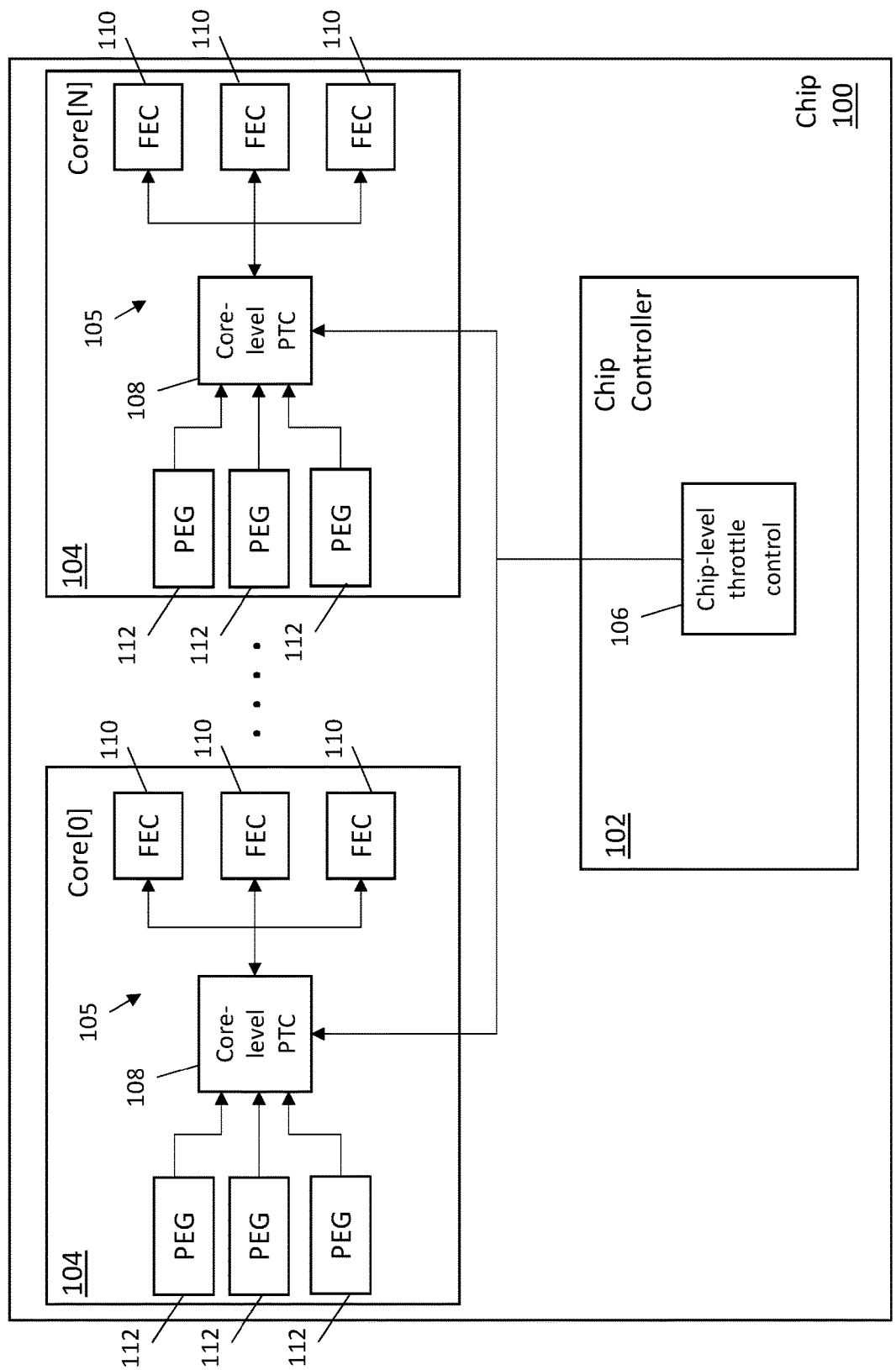
FIG. 2 is a block diagram of a multi-core processor chip according to a non-limiting embodiment.

The example of FIG. 2 depicts a multi-core processor chip 100 as an example of a system that can implement embodiments of the invention. The multi-core processor chip 100 may be one of the processors 16 of FIG. 1. In the example of FIG. 2, the multi-core processor chip 100 includes a chip controller 102 coupled to a plurality of processor cores 104, where each of the processor cores 104 can include one or more instruction execution pipelines to execute a plurality of instruction streams in parallel. There can be any number of two or more processor cores 104 (e.g., 0 to N) within the multi-core processor chip 100, and a processing system, such as the computer system 10 of FIG. 1, can include multiple instances of the multi-core processor chip 100. Each of the processor cores 104 can also include a plurality of throttle controllers 105 configured to control a plurality of throttling actions including dynamic adjustment of execution suspension within the processor cores 104. Execution suspension can suspend instruction execution within the processor cores 104 for one or more cycles. Execution suspension can be performed in parallel across the processor cores 104 and may be implemented in various controlled patterns to achieve a reduction in power consumption for the multi-core processor chip 100. A chip-level throttle controller 106 of the chip controller 102 can be coupled to the processor cores 104 and configured to synchronize the throttling actions between the processor cores 104.

In the example of FIG. 2, the throttle controllers 105 of the processor cores 104 are configured in a modular hierarchy with a plurality of levels, including a core-level performance throttle controller 108 coupled to a plurality of functional-level event controllers 110 per processor core 104. The core-level performance throttle controller 108 can also be coupled to one or more core-level pre-event generators 112 configured to resolve a plurality of input throttle events at each of the processor cores 104. The chip-level throttle control 106 can be operably coupled to the core-level performance throttle controller 108 of each of the processor cores 104. The functional-level event controllers 110 can be configured to initiate throttling actions based on one or more local events and align the throttling actions with a global synchronization from the chip-level throttle control 106. The chip-level throttle control 106 can be configured to generate a staggered exit of the throttling actions to the core-level performance throttle controller 108 of each of the processor cores 104. The throttling actions can be ramped over a plurality of time steps between an initial throttled state and an unthrottled state. Throttle events can be triggers to perform throttling actions, while throttling actions can include changing a level of throttling requested.

As an example, table 1 illustrates 16-cycle throttle patterns to suspend execution when a "1" is in the pattern for the corresponding cycle. Thus, a 25% throttle level can include two suspend execution cycles followed by six non-suspended execution cycles in a repeating pattern, while a 75% throttle level can include six suspend execution cycles followed by two non-suspended execution cycles in a repeating pattern.

TABLE 1

Throttle Pattern Table Example

| Throttle level | Throttle % | 16-cycle throttle (suspend execution) pattern |
| --- | --- | --- |
| 0 | 0 | 0000_0000_0000_0000 |
| 1 | 6.25 | 1000_0000_0000_0000 |
| 2 | 12.5 | 1000_0000_1000_0000 |
| 3 | 18.75 | 1100_0000_1000_0000 |
| 4 | 25 | 1100_0000_1100_0000 |
| 5 | 31.25 | 1110_0000_1100_0000 |
| 6 | 37.5 | 1110_0000_1110_0000 |
| 7 | 43.75 | 1111_0000_1110_0000 |
| 8 | 50 | 1111_0000_1111_0000 |
| 9 | 56.25 | 1111_1000_1111_0000 |
| 10 | 62.5 | 1111_1000_1111_1000 |
| 11 | 68.75 | 1111_1100_1111_1000 |
| 12 | 75 | 1111_1100_1111_1100 |
| 13 | 81.25 | 1111_1110_1111_1100 |
| 14 | 87.5 | 1111_1110_1111_1110 |
| 15 | 93.75 | 1111_1111_1111_1110 |
| 16 | 100 | 1111_1111_1111_1111 |

Figure 3:
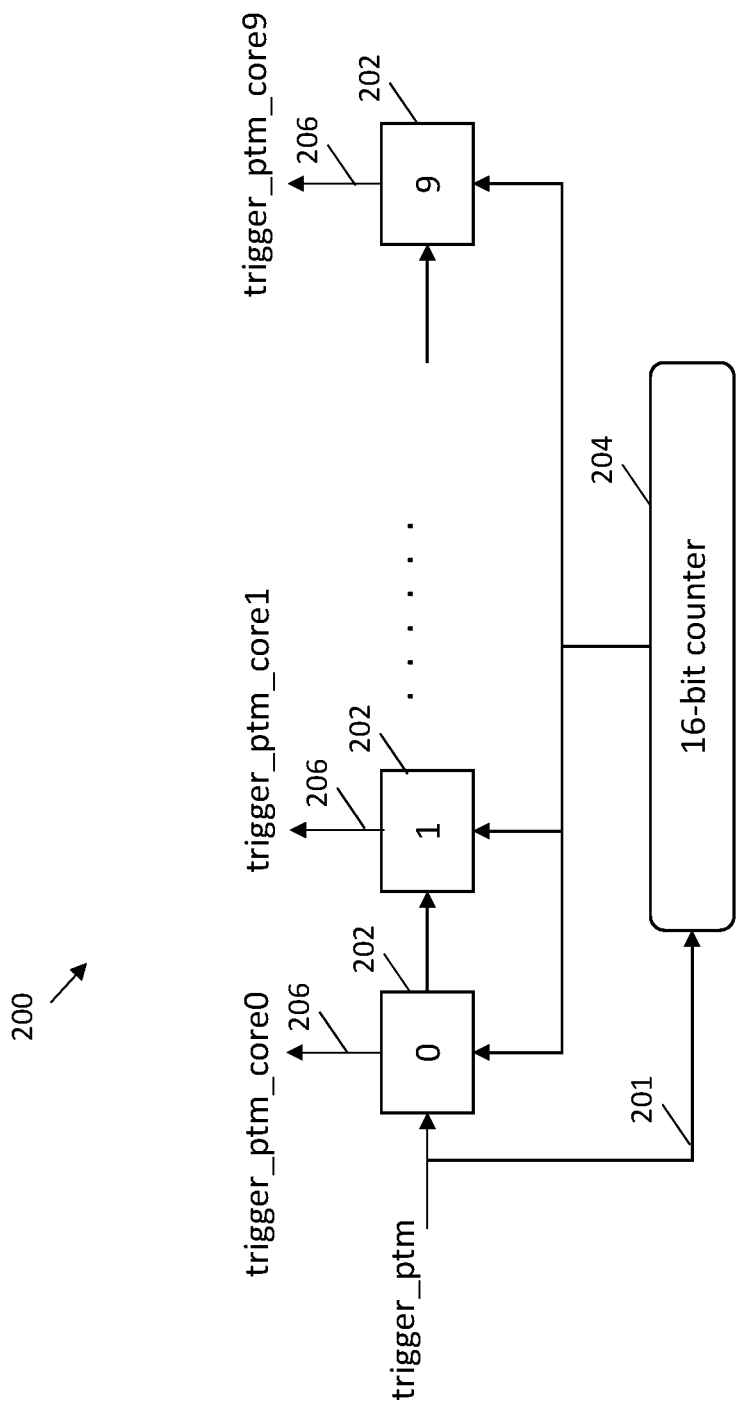
FIG. 3 is a block diagram illustrating a throttle release according to a non-limiting embodiment.
Figure 4:
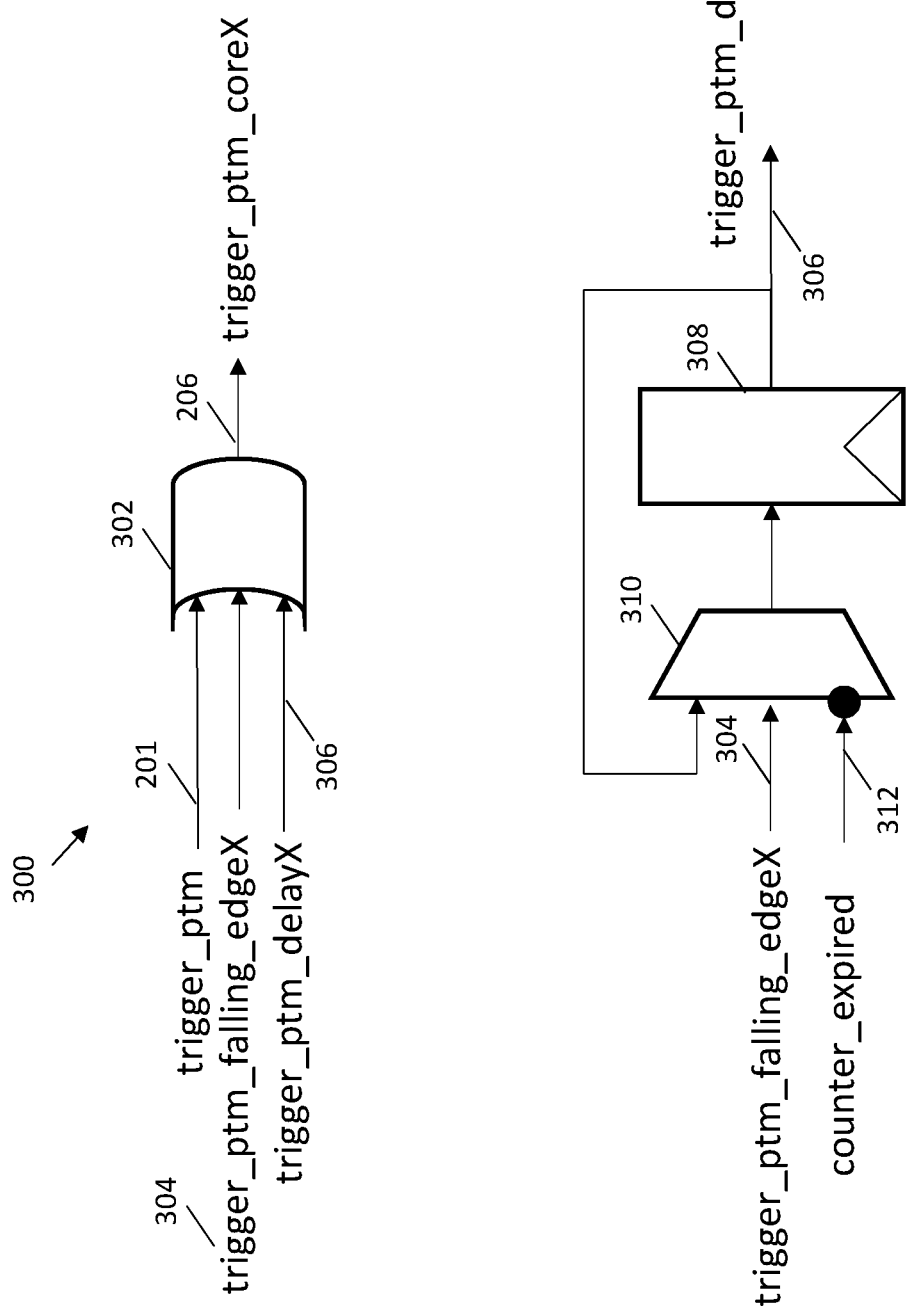
FIG. 4 is a block diagram illustrating a throttle release delay according to a non-limiting embodiment.

In embodiments, the chip-level throttle control 106 can make a decision to throttle all of the processor cores 104, which is depicted as "trigger_ptm" in FIGS. 3 and 4. The "trigger_ptm" signal can be multi-dropped to all of the processor cores 104 and have a staggered de-assertion to the processor cores 104 as depicted in the examples of FIGS. 3 and 4. FIG. 3 is an example of a throttle release 200 for an embodiment with ten processor cores 104, where trigger_ptm signal 201 is provided to a plurality of latches 202 in a series and a counter (e.g., a 16-bit counter) 204. When the trigger_ptm signal 201 enables the counter 204, the trigger_ptm signal 201 can be clocked through the series of latches 202 to stagger changes/release of throttle level signals 206 (e.g., trigger_ptm_core0, trigger_ptm_core1, . . . , trigger_ptm_core9) to corresponding instances of the processor cores 104 of FIG. 2. FIG. 4 depicts additional logic that can be incorporated in determining the state of each of the throttle level signals 206 as throttle release delay circuits 300. Each of the latches 202 of FIG. 3 can interface with an OR-gate 302 that outputs each throttle level signal 206 (e.g., trigger_ptm_coreX generally) as a logical OR function of the trigger_ptm signal 201, a trigger_ptm_falling_edgeX signal 304 and a trigger_ptm_delayX signal 306. The trigger_ptm_falling_edgeX signal 304 can be a falling edge of the trigger_ptm signal 201 as propagated through the series of latches 202 corresponding to the processor cores 104. The trigger_ptm_delayX signal 306 can be generated, for example, by a latch 308 that clocks through an output of a multiplexer 310. The multiplexer 310 can select between a past value of the trigger_ptmdelayX signal 306 and the trigger_ptm_falling_edgeX signal 304 based on a counter_expired signal 312 (which may be low asserting) that can be set based on the expiration of the counter 204 of FIG. 3.

Figure 5:
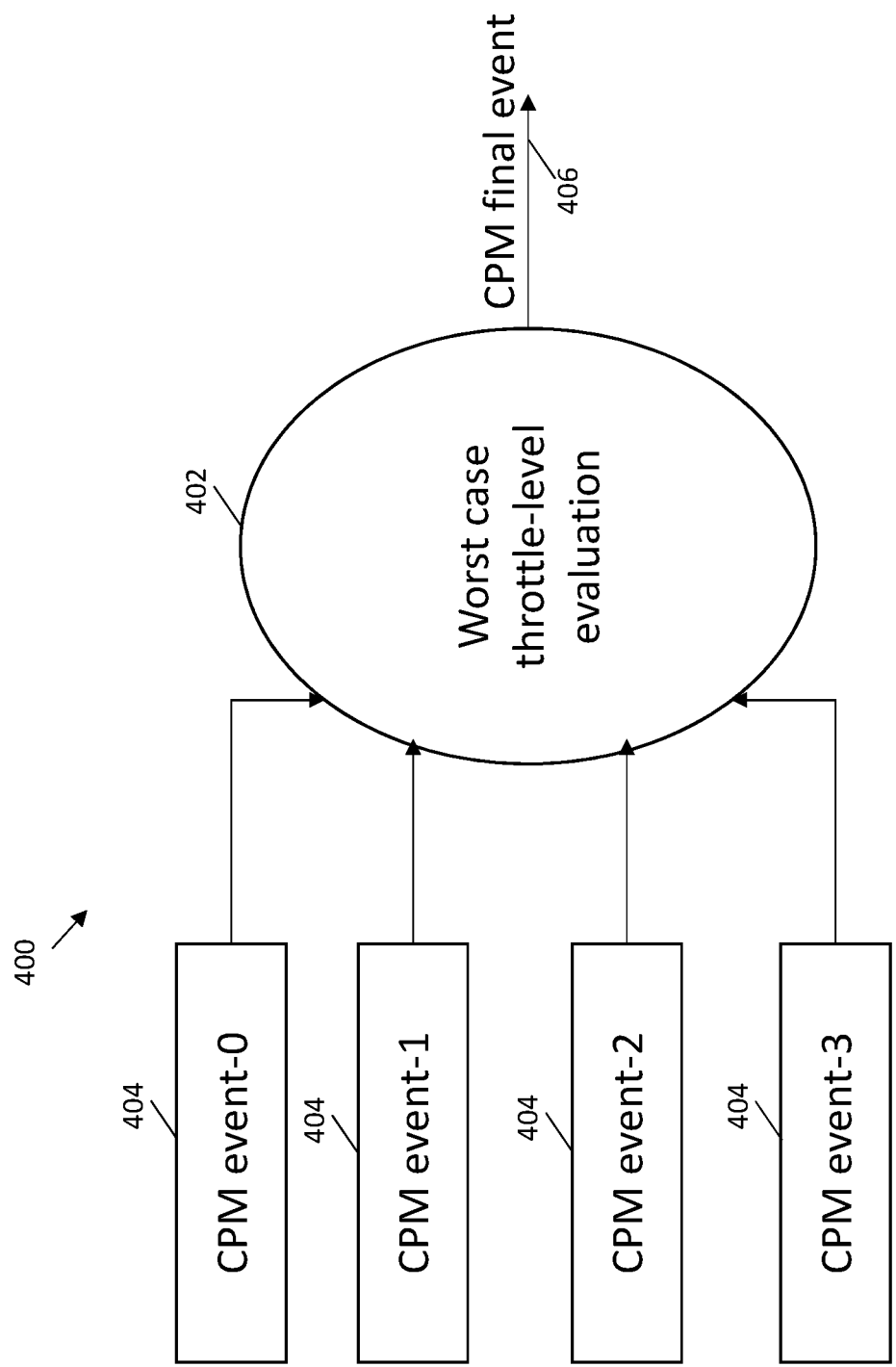
FIG. 5 is a flow diagram illustrating a throttle pre-event generator for critical-path events according to a non-limiting embodiment.
Figure 6:
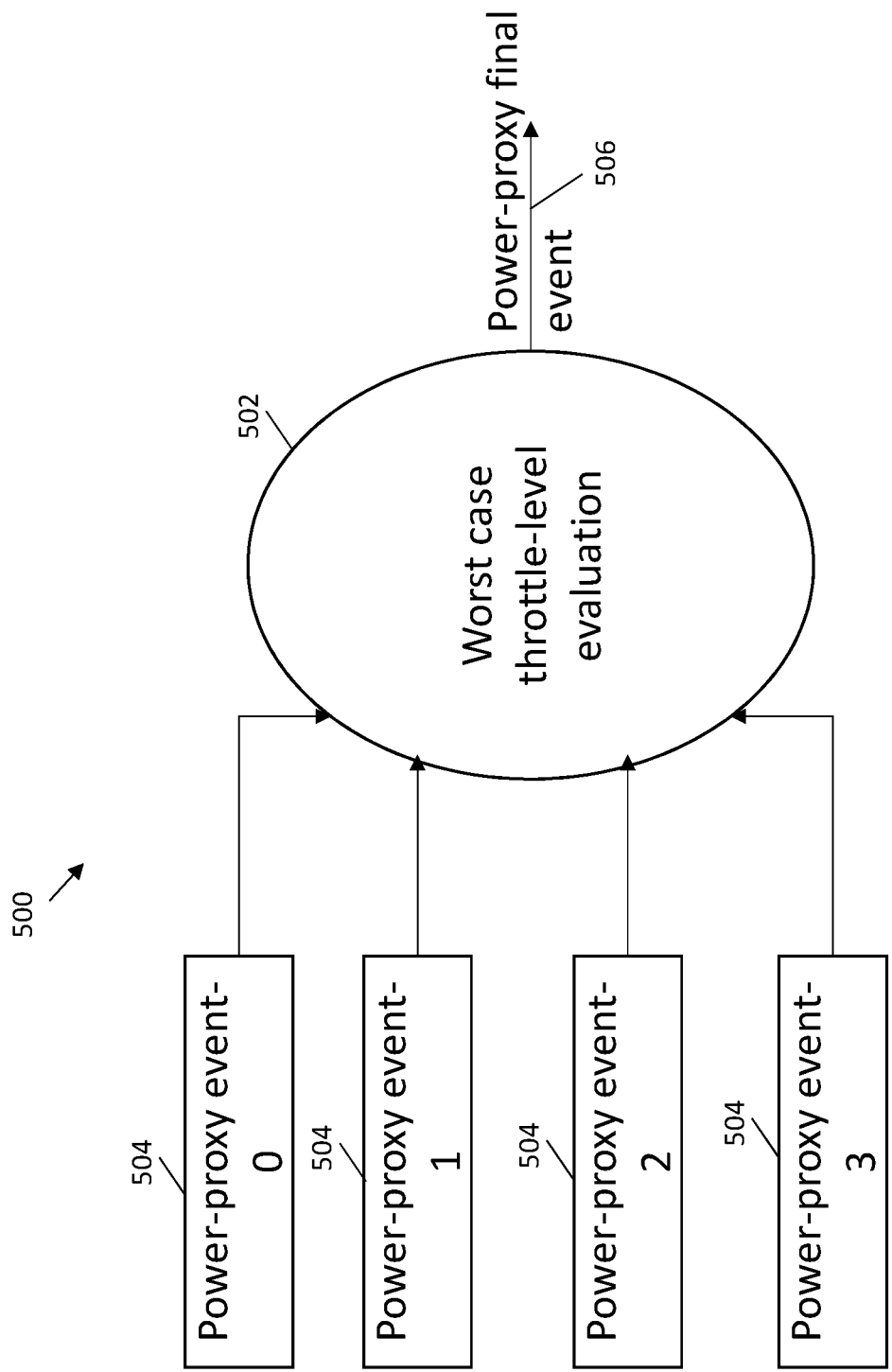
FIG. 6 is a flow diagram illustrating a throttle pre-event generator for power-proxy events according to a non-limiting embodiment.
Figure 7:
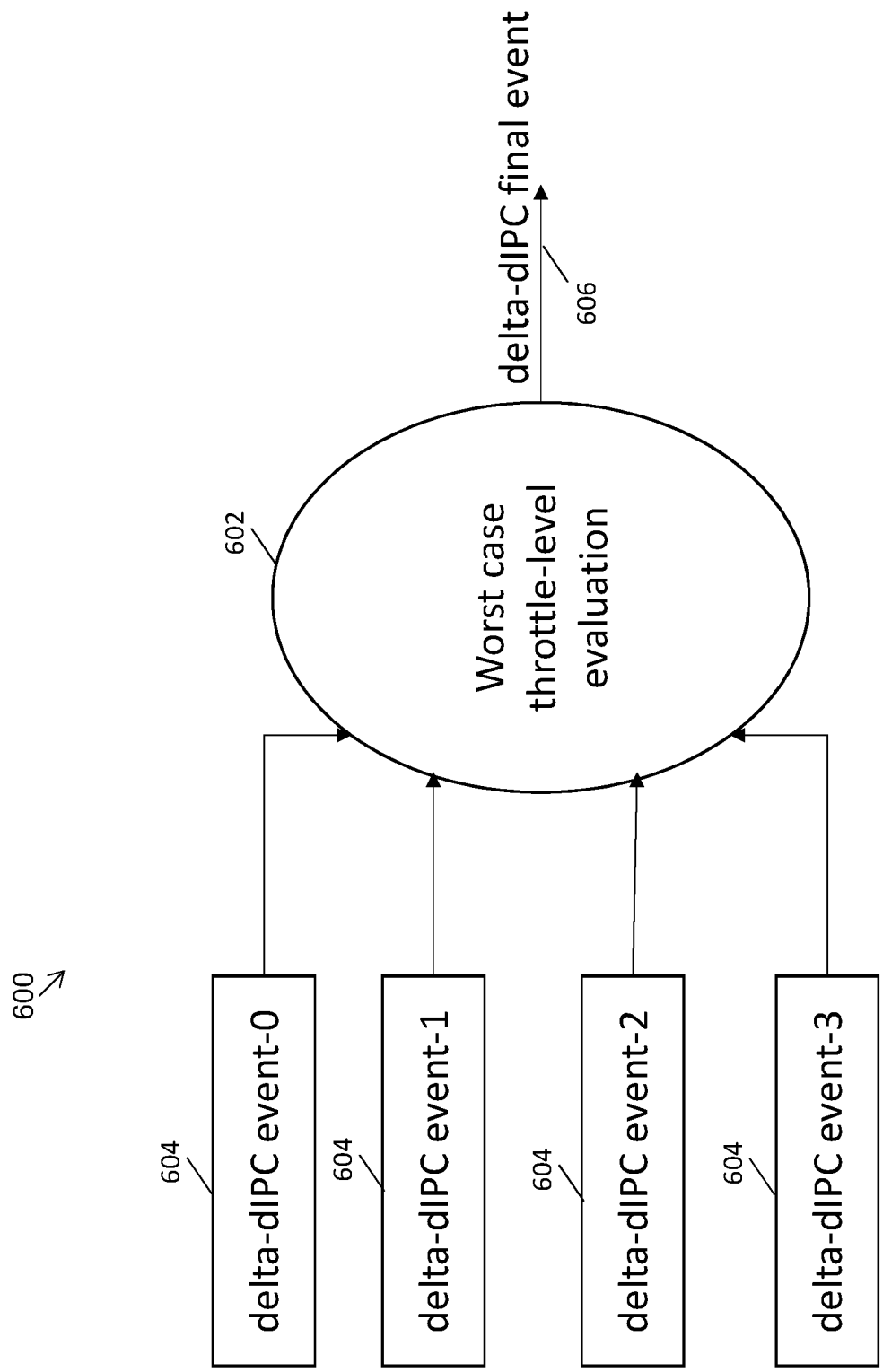
FIG. 7 is a flow diagram illustrating a throttle pre-event generator for current-change events according to a non-limiting embodiment.

FIGS. 5-7 depict examples of throttle pre-event generators 400, 500, and 600, which may be embodiments of the core-level pre-event generators 112 of FIG. 2. The throttle pre-event generator 400 for critical-path events can include a worst-case throttle-level evaluation 402 configured to evaluate a plurality of critical path method (CPM) events 404 (e.g., CPM events 0, 1, 2, 3) to determine a critical path final event 406. The CPM events 404 can include scheduled events that are based on duration, precedence constraints, working time, and/or other considerations, where the highest throttle level from available inputs is selected as the worst case. The throttle pre-event generator 500 for power-proxy events can include a worst-case throttle-level evaluation 502 configured to evaluate a plurality of power-proxy events 504 (e.g., power-proxy events 0, 1, 2, 3) to determine a power-proxy final event 506. Power-proxy events 504 can include idle power and/or active power computations to support fine-grained power management, where the highest throttle level from available inputs is selected as the worst case. The throttle pre-event generator 600 for current-change events can include a worst-case throttle-level evaluation 602 configured to evaluate a plurality of current-change events 604 (e.g., current-change events 0, 1, 2, 3) to determine a current-change final event 606. Current-change events 604 can include detected changes in a rate of electric current change for dynamic interactive power control. Although each of the examples of throttle pre-event generators 400, 500, and 600 depict four events, it will be understood that the throttle pre-event generators 400, 500, and 600 can interface with any number of events.

For each of the worst case throttle-level evaluations 402, 502, and 602, event counters can be used to track the occurrence of events and determine a worst case throttle level and declare a final event, such as the critical path final event 406, power-proxy final event 506, and current-change final event 606. Events, such as the CPM events 404, power-proxy events 504, and current-change events 604 can be short-term transient events or may exist for extended periods of time. Event counters associated with the events can track how long particular events have persisted. A highest value of an event counter can be used to select as a worst case throttle level for each of the critical path final event 406, power-proxy final event 506, and current-change final event 606. When an event is no longer present, the event counters can incrementally be decreased or otherwise cleared/reset.

Figure 8:
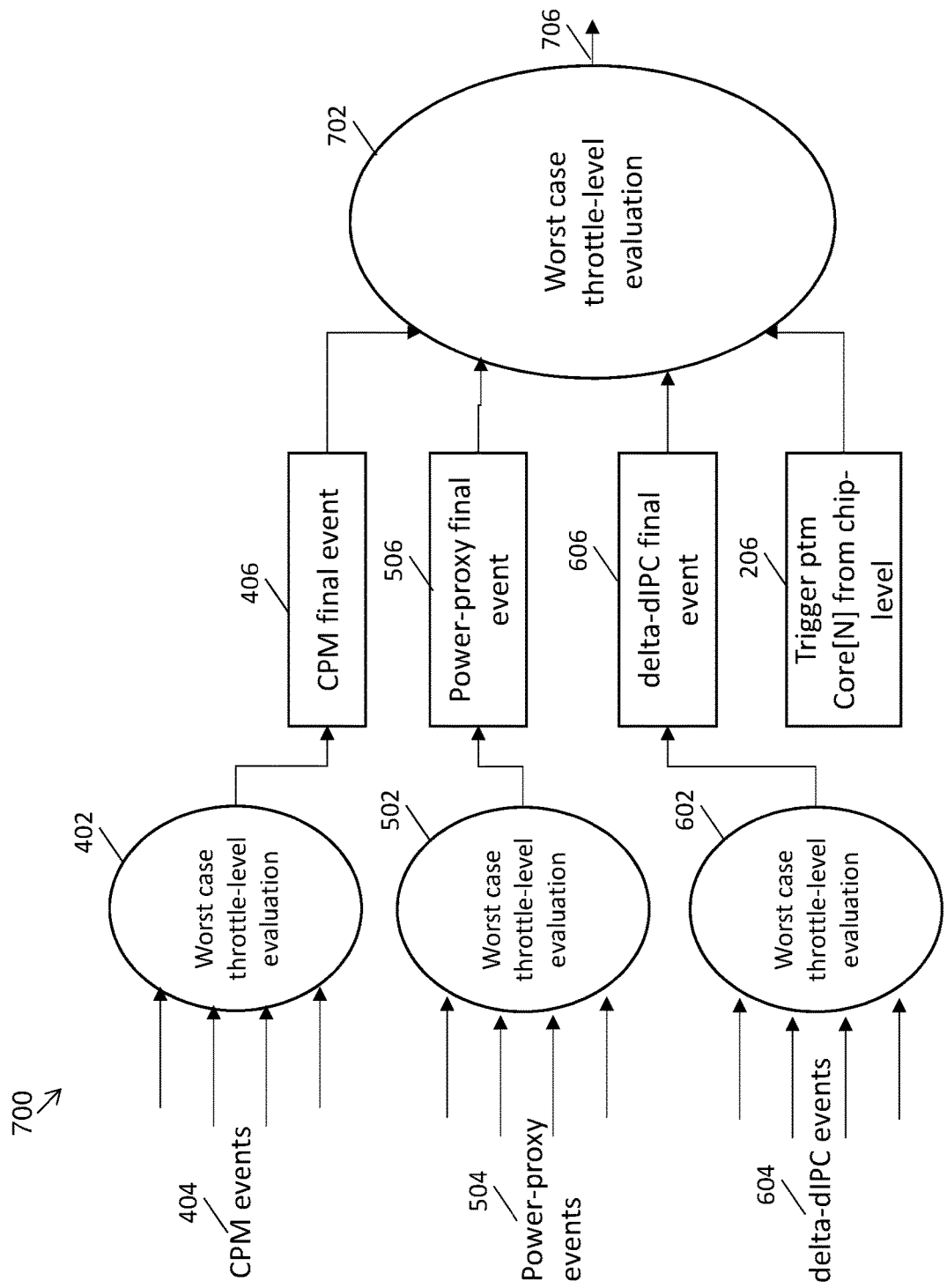
FIG. 8 is a flow diagram illustrating a core-level performance throttle controller according to a non-limiting embodiment.

FIG. 8 is a flow diagram illustrating a core-level performance throttle controller 700 according to a non-limiting embodiment that merges the worst case throttle-level evaluations 402, 502, and 602 and corresponding final events (e.g., critical path final event 406, power-proxy final event 506, and current-change final event 606) as inputs to a worst case throttle-level evaluation 702. The core-level performance throttle controller 700 is an example of the core-level performance throttle controller 108 of FIG. 2. The throttle level signal 206 corresponding to the processor core 104 that includes the worst case throttle-level evaluation 702 serves as an additional input to the worst case throttle-level evaluation 702. The worst case throttle-level evaluation 702 can include event counters to determine an overall throttle event 706. The worst case throttle-level evaluation 702 can determine an initial throttle level based on the worst case values (e.g., highest) of the critical path final event 406, power-proxy final event 506, current-change final event 606 and the throttle level signal 206. The overall throttle event 706 can be routed as one or more execution suspend commands to multiple components of the associated processor core 104, such as the functional-level event controllers 110 of FIG. 2. The overall throttle event 706 can be set to an initial throttle level and gradually changed or ramped over a period of time to prevent step changes in throttling reductions. If new throttle events are detected while the overall throttle event 706 is decreasing, the overall throttle event 706 can be adjusted to increase throttling further responsive to the new throttle events. The ramping to decrease throttling need not be linear and can include periods of time extended at a same throttling level, for instance, to balance throttling adjustments occurring elsewhere within the multi-core processor chip 100 of FIG. 2 and/or wait for a synchronization signal.

Figure 9:
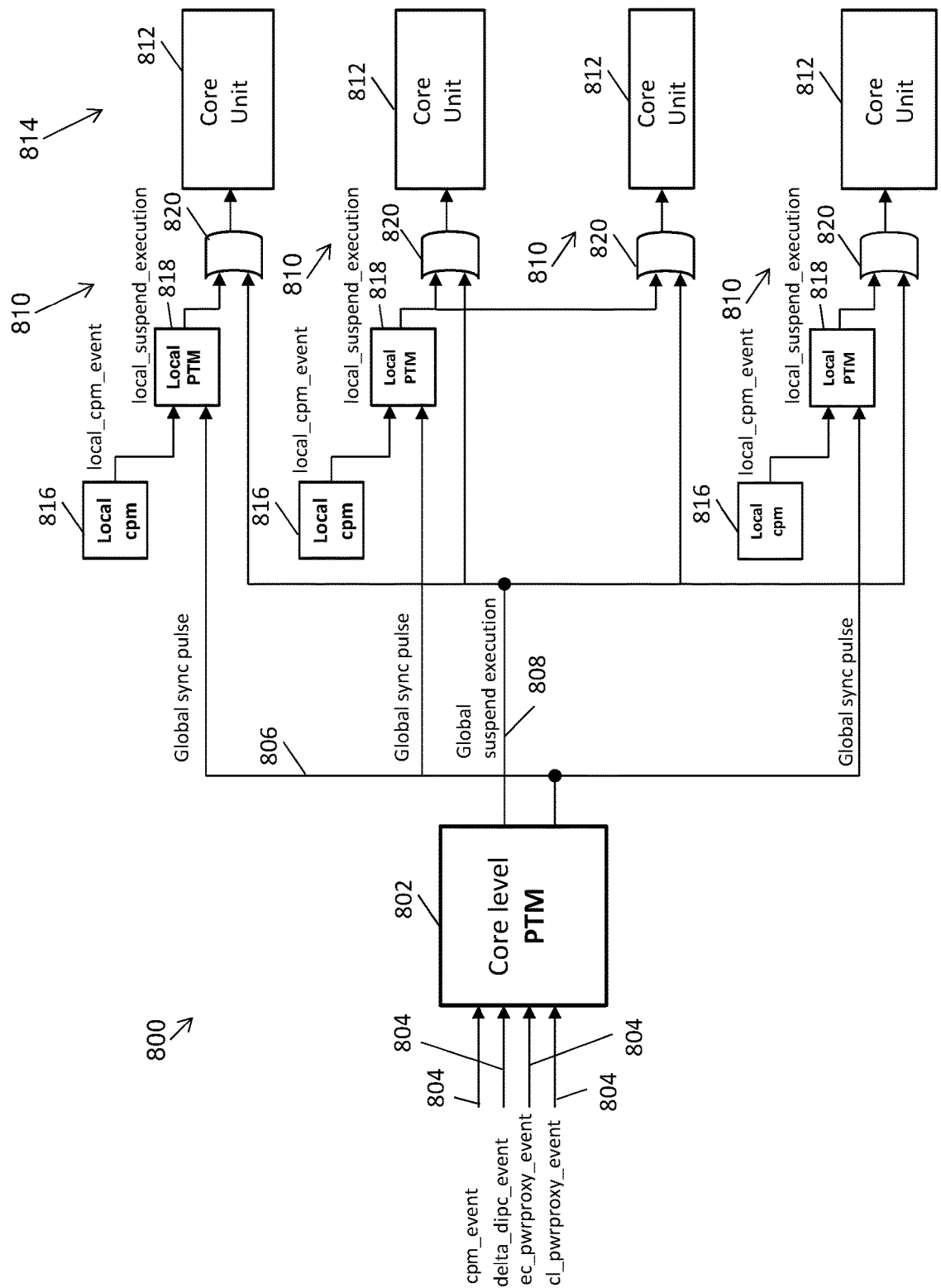
FIG. 9 is a block diagram illustrating a core functional unit-level controller according to a non-limiting embodiment.

FIG. 9 is a block diagram illustrating a core functional unit-level controller 800 according to a non-limiting embodiment. The core functional unit-level controller 800 includes a core-level performance throttle controller 802, such as one of the core-level performance throttle controller 108 of FIG. 2. The core-level performance throttle controller 802 can receive a plurality of events 804, such as CPM events, power-proxy events, and current-change events, as embodiments of the critical path final event 406, power-proxy final event 506, and current-change final event 606 of FIGS. 5-8 and output a global synchronization pulse 806 and a global suspend execution signal 808. The global synchronization pulse 806 can align local timing with signals from the chip-level throttle controller 106, and the global suspend execution signal 808 can be based on the overall throttle event 706 of FIG. 8. For example, the throttle level defined for the overall throttle event 706 can map to a throttle level of table 1, resulting in a corresponding throttle pattern to suspend execution for one or more cycles. The global synchronization pulse 806 and the global suspend execution signal 808 can be provided to a plurality of functional-level event controllers 810, which can be embodiments of the functional-level event controllers 110 of FIG. 2.

The functional-level event controllers 810 can interface with a plurality of core units 812 of the processor core 104, for instance, that collectively form an instruction execution pipeline 814. For example, instances of the functional-level event controllers 810 can interface with one or more core units 812 to temporarily suspend execution of instructions within the corresponding core unit 812. Examples of the core units 812 can include instruction fetch units, sequencing units, execution units, completion units, and other such units or modules known in the art. In some instances, signals can be shared between the functional-level event controllers 810 where a group of core units 812 has similar timing constraints. The functional-level event controllers 810 allow local events 816 to produce local suspend execution triggers through local throttle trigger controls 818, which can be combined and synchronized with global signals through an OR gate 820.

Figure 10:
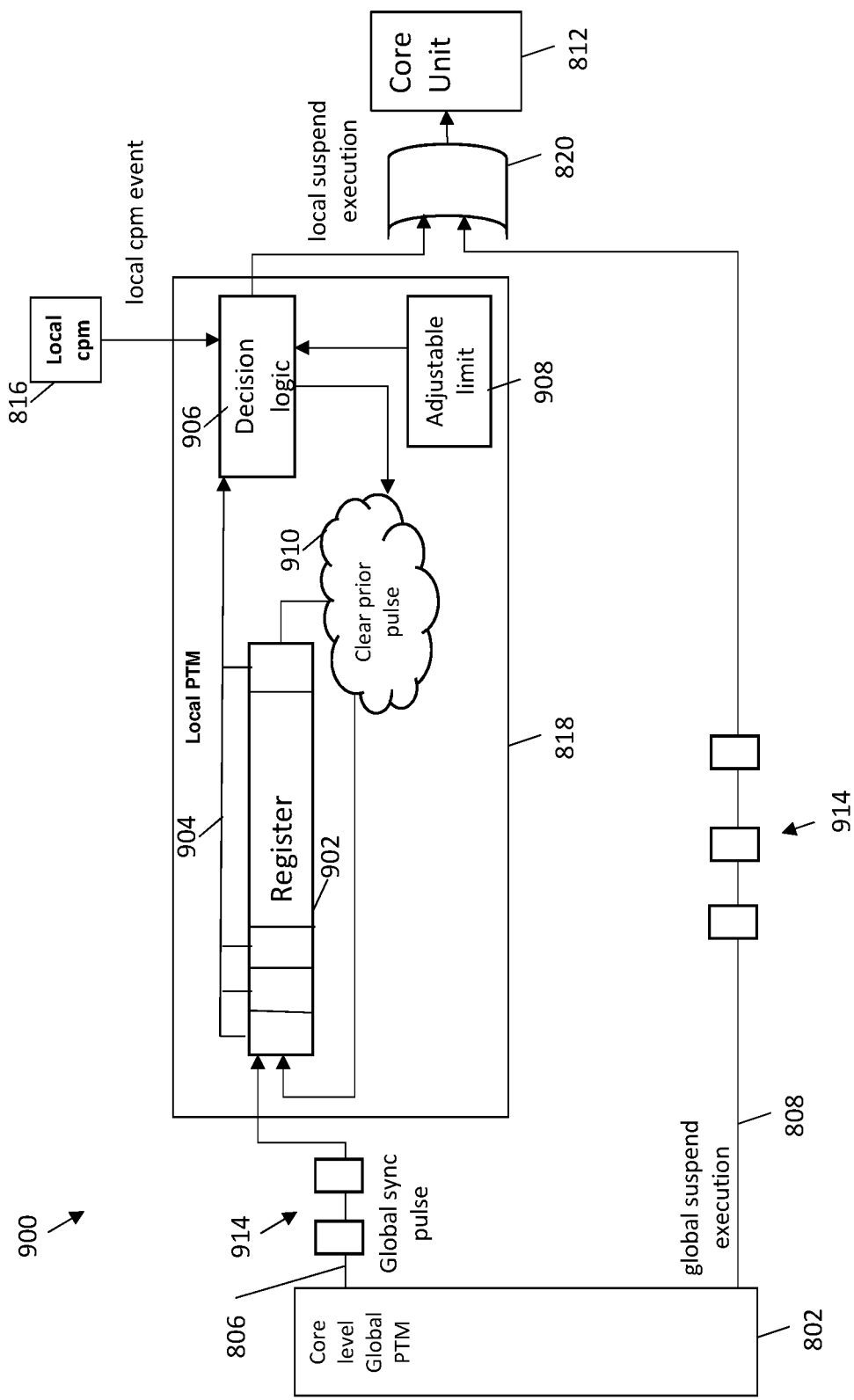
FIG. 10 is a block diagram illustrating a performance throttle synchronization controller according to a non-limiting embodiment.

FIG. 10 is a block diagram illustrating a performance throttle synchronization controller 900 that includes a further example of the local throttle trigger control 818 according to a non-limiting embodiment. In the example of FIG. 10, the local throttle trigger control 818 includes a register structure 902 that can receive the global synchronization pulse 806 and provide multiple bits of a local throttle signal 904 to decision logic 906. The decision logic 906 can determine whether a local suspend execution signal should be output to the OR gate 820 based on a local event 816 and an adjustable limit 908. For example, the decision logic 906 can count occurrences of the local event 816 to determine whether the adjustable limit 908 has been met. The local throttle signal 904 can provide a time reference to synchronize with the global suspend execution signal 808. When the local event 816 is no longer present, the decision logic 906 can trigger a clearing of a prior pulse 910, which can be further propagated to the register structure 902. Groups of latches 914 can be placed in-line with the global synchronization pulse 806 and the global suspend execution signal 808 to further synchronize timing.

Figure 11:
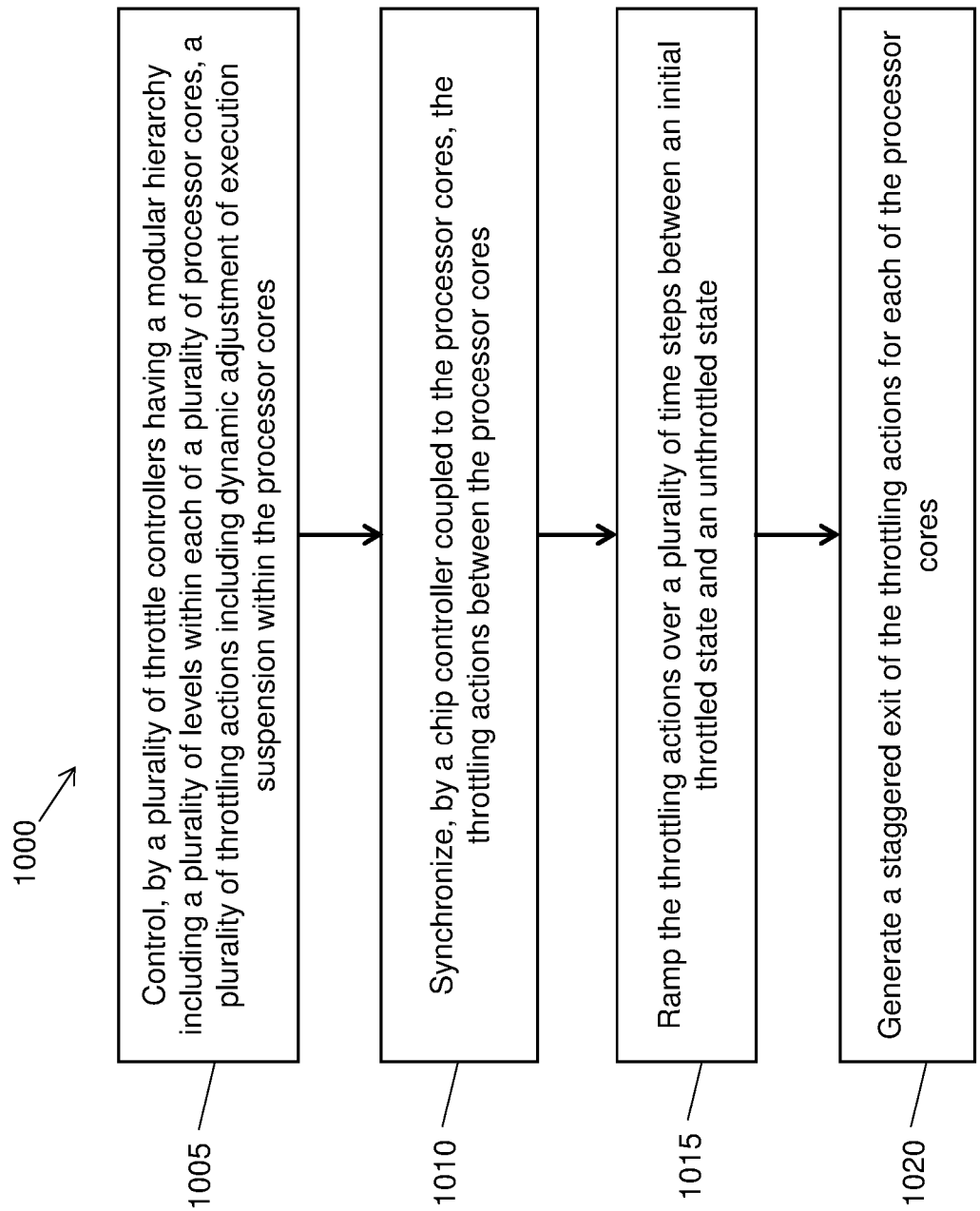
FIG. 11 is a flow diagram illustrating a method according to a non-limiting embodiment.

FIG. 11 depicts a flow diagram illustrating a process 1000 according to a non-limiting embodiment. The process 1000 can be performed by a system of a multi-core processor chip, such as the multi-core processor chip 100 of FIG. 2. Although described in reference to the multi-core processor chip 100 of FIG. 2, the process 1000 may be performed by the computer system 10 of FIG. 1 or other system configurations not depicted.

At block 1005, a plurality of throttle controllers 105 within each of a plurality of processor cores 104 can control a plurality of throttling actions including dynamic adjustment of execution suspension within the processor cores 104. The throttle controllers 105 can include a modular hierarchy with a plurality of levels. One or more core-level pre-event generators 112 can be operably coupled to a core-level performance throttle controller 108, where the core-level pre-event generators 112 resolve a plurality of input throttle events at each of the processor cores 104 based on the modular hierarchy. Input throttle events can include, for instance, CPM events 404, power-proxy events 504, current-change events 604, and/or other detectable events that may be associated with thermal issues, noise issues, voltage issues, and/or current supply issues for the multi-core processor chip 100.

At block 1010, a chip controller 102 coupled to the processor cores 104 can synchronize the throttling actions between the processor cores 104. A chip-level throttle controller 106 of the chip controller 102 can perform higher-level synchronization between the core-level performance throttle controller 108 of multiple processor cores 104, while localized synchronization can be managed between the core-level performance throttle controller 108 and the functional-level event controllers 110 at each processor core 104. The functional-level event controllers 110 can initiate the throttling actions based on one or more local events 816 in combination with higher-level events from the core-level pre-event generators 112 and/or chip-level throttle controller 106. For example, the functional-level event controllers 110 can align the throttling actions with a global synchronization from the chip-level throttle control 106.

At block 1015, the throttling actions can be ramped over a plurality of time steps between an initial throttled state and an unthrottled state. For instance, if a worst-case throttle-level evaluation of a plurality of events indicates an initial throttle state of 50%, after commanding a 50% throttle to suspend execution every other cycle, the throttling actions can be reduced in increments of about 6.25% per step until returning to an unthrottled state (0% throttling with no execution suspension commanded).

At block 1020, the chip-level throttle control 106 can generate a staggered exit of the throttling actions to the core-level performance throttle controller 108 of each of the processor cores 104. Release of throttling can be delayed such that a first processor core 104 changes throttling levels with respect to one or more other processor cores 104. For instance, in a ramped throttle release, processor cores 104 can transition back to the unthrottled state in a staggered pattern.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
controlling, by a plurality of throttle controllers having a modular hierarchy comprising a plurality of levels within each of a plurality of processor cores, a plurality of throttling actions comprising dynamic adjustment of execution suspension within the processor cores, wherein the modular hierarchy comprises a core-level performance throttle controller coupled to a plurality of functional-level even controllers per processor core, the functional-level event controllers interfacing with one or more core units within the processor cores;
resolving a plurality of input throttle events at each of the processor cores based on the modular hierarchy; and
synchronizing, by a chip controller coupled to the processor cores, the plurality of throttling actions between the processor cores, wherein the chip controller comprises a chip-level throttle control operably coupled to the core-level performance throttle controller of each of the processor cores.

2. The method of claim 1, wherein the plurality of input throttle events is resolved at each of the processor cores by one or more core-level pre-event generators operably coupled to the core-level performance throttle controller.

3. The method of claim 1, further comprising:
initiating, by the functional-level event controllers, the plurality of throttling actions based on one or more local events; and
aligning, by the functional-level event controllers, the plurality of throttling actions with a global synchronization from the chip-level throttle control.

4. The method of claim 1, further comprising:
generating, by the chip-level throttle control, a staggered exit of the plurality of throttling actions to the core-level performance throttle controller of each of the processor cores, wherein the staggered exit comprises a delay in changing a throttle level of at least one of the processor cores with respect to one or more other of the processor cores.

5. The method of claim 1, further comprising:
ramping the plurality of throttling actions over a plurality of time steps between an initial throttled state and an unthrottled state by incrementally reducing a throttle level per time step over the plurality of time steps.

6. The method of claim 1, wherein the one or more core units comprise one or more of instruction fetch units, sequencing units, execution units, and completion units.

7. A system comprising:
a plurality of processor cores each comprising a plurality of throttle controllers having a modular hierarchy comprising a plurality of levels configured to control a plurality of throttling actions comprising dynamic adjustment of execution suspension within the processor cores, wherein the modular hierarchy comprises a core-level performance throttle controller coupled to a plurality of functional-level event controllers per processor core, the functional-level event controllers interfacing with one or more core units within the processor cores; and
a chip controller coupled to the processor cores and configured to synchronize the plurality of throttling actions between the processor cores, wherein the chip controller comprises a chip-level throttle control operably coupled to the core-level performance throttle controller of each of the processor cores.

8. The system of claim 7, wherein the core-level performance throttle controller is coupled to one or more core-level pre-event generators configured to resolve a plurality of input throttle events at each of the processor cores.

9. The system of claim 7, wherein the functional-level event controllers are configured to initiate the plurality of throttling actions based on one or more local events and align the plurality of throttling actions with a global synchronization from the chip-level throttle control.

10. The system of claim 7, wherein the chip-level throttle control is configured to generate a staggered exit of the plurality of throttling actions to the core-level performance throttle controller of each of the processor cores, wherein the staggered exit comprises a delay in changing a throttle level of at least one of the processor cores with respect to one or more other of the processor cores.

11. The system of claim 7, wherein the plurality of throttling actions is ramped over a plurality of time steps between an initial throttled state and an unthrottled state by incrementally reducing a throttle level per time step over the plurality of time steps.

12. The system of claim 7, wherein the one or more core units comprise one or more of instruction fetch units, sequencing units, execution units, and completion units.

13. A computer program product comprising a computer readable storage medium having program instructions embodied therewith, the program instructions executable by a processing circuit to perform a plurality of operations comprising:
controlling, by a plurality of throttle controllers having a modular hierarchy comprising a plurality of levels within each of a plurality of processor cores, a plurality of throttling actions comprising dynamic adjustment of execution suspension within the processor cores, wherein the modular hierarchy comprises a core-level performance throttle controller coupled to a plurality of functional-level event controllers per processor core, the functional-level event controllers interfacing with one or more core units within the processor cores;
resolving a plurality of input throttle events at each of the processor cores based on the modular hierarchy; and
synchronizing, by a chip controller coupled to the processor cores, the plurality of throttling actions between the processor cores, wherein the chip controller comprises a chip-level throttle control operably coupled to the core-level performance throttle controller of each of the processor cores.

14. The computer program product of claim 13, wherein the plurality of input throttle events is resolved at each of the processor cores by one or more core-level pre-event generators operably coupled to the core-level performance throttle controller.

15. The computer program product of 13, wherein the program instructions executable by the processing circuit are further configured to perform operations comprising:
initiating, by the functional-level event controllers, the plurality of throttling actions based on one or more local events;
aligning, by the functional-level event controllers, the plurality of throttling actions with a global synchronization from the chip-level throttle control; and
generating, by the chip-level throttle control, a staggered exit of the plurality of throttling actions to the core-level performance throttle controller of each of the processor cores, wherein the staggered exit comprises a delay in changing a throttle level of at least one of the processor cores with respect to one or more other of the processor cores.

16. The computer program product of claim 13, wherein the program instructions executable by the processing circuit are further configured to perform operations comprising:
ramping the plurality of throttling actions over a plurality of time steps between an initial throttled state and an unthrottled state by incrementally reducing a throttle level per time step over the plurality of time steps.

17. The computer program product of claim 13, wherein the one or more core units comprise one or more of instruction fetch units, sequencing units, execution units, and completion units.

\* \* \* \* \*